(12) United States Patent
Borghesani et al.

(10) Patent No.: US 10,976,008 B2
(45) Date of Patent: Apr. 13, 2021

(54) APPARATUS AND METHOD FOR FLOW EQUIPARTITION

(71) Applicant: O.M.T. OFFICINA MECCANICA TARTARINI S.r.l., Castel Maggiore (IT)

(72) Inventors: Omero Borghesani, Centro (IT); Stefano Zecchi, Bologna (IT)

(73) Assignee: O.M.T. OFFICINA MECCANICA TARTARINI S.r.I., Castel Maggiore (IT)

(*) Notice: Subject to any disclaimer, the term of this patent is extended or adjusted under 35 U.S.C. 154(b) by 71 days.

(21) Appl. No.: 16/154,926

(22) Filed: Oct. 9, 2018

(65) Prior Publication Data

US 2019/0113179 A1    Apr. 18, 2019

Related U.S. Application Data

(63) Continuation of application No. 15/106,405, filed as application No. PCT/IB2015/051939 on Mar. 17, 2015, now Pat. No. 10,100,981.

(30) Foreign Application Priority Data

Mar. 18, 2014 (IT) .......................... BO2014A000139

(51) Int. Cl.
G05D 16/16 (2006.01)
F17D 3/01 (2006.01)
(Continued)

(52) U.S. Cl.
CPC ................ *F17D 3/01* (2013.01); *F17D 1/04* (2013.01); *G05D 16/0402* (2019.01);
(Continued)

(58) Field of Classification Search
CPC ......... Y10T 137/2514; Y10T 137/2521; Y10T 137/87153; Y10T 137/87161; G05D 16/16; G05D 16/1613
See application file for complete search history.

(56) References Cited

U.S. PATENT DOCUMENTS 3,783,894 A    1/1974   Davison
4,044,792 A *  8/1977   Kjaergaard ........ G05D 16/0655
                                                137/505.22
(Continued)

FOREIGN PATENT DOCUMENTS

CN    1647000 A    7/2005
CN    1809794 A    7/2006
(Continued)

OTHER PUBLICATIONS

International Preliminary Report on Patentability for Application No. PCT/IB2015/051939, dated Sep. 20, 2016.
(Continued)

*Primary Examiner* — Kevin F Murphy
(74) *Attorney, Agent, or Firm* — Marshall, Gerstein & Borun LLP (57) ABSTRACT

A system includes a first pressure-adjusting device positioned in a first line and a second pressure-adjusting device positioned in a second line. The first pressure-adjusting device is actuated solely via a first pneumatic signal output from a first pilot valve to control a downstream pressure in the first line. The second pressure-adjusting device is actuated via the first pneumatic signal in a first mode of operation, and is actuated via a second pneumatic signal output from a second pilot valve in a second mode of operation to control a downstream pressure in the second line.

22 Claims, 4 Drawing Sheets

(51) Int. Cl.
*G05D 16/04* (2006.01)
*F17D 1/04* (2006.01)

(52) U.S. Cl.
CPC ......... *G05D 16/0404* (2019.01); *G05D 16/16* (2013.01); *G05D 16/163* (2013.01); *Y10T 137/2514* (2015.04); *Y10T 137/2521* (2015.04)

(56) References Cited

U.S. PATENT DOCUMENTS

| | | |
|---|---|---|
| 4,752,211 A | 6/1988 | Sabin |
| 4,993,447 A | 2/1991 | Camire |
| 7,201,180 B2 | 4/2007 | Ephrat et al. |
| 8,496,022 B2 | 7/2013 | Sugiyama et al. |
| 2002/0170598 A1 | 11/2002 | Girard et al. |

FOREIGN PATENT DOCUMENTS

| | | |
|---|---|---|
| CN | 101140474 A | 3/2008 |
| CN | 101727111 A | 6/2010 |
| WO | WO-2012/153310 A1 | 11/2012 |

OTHER PUBLICATIONS

Office Action for Chinese Application No. 201580014776.1, dated Aug. 3, 2018.
International Search Report and Written Opinion for Application No. PCT/IB2015/051939, dated Jul. 21, 2015.

\* cited by examiner

FIG. 4

# APPARATUS AND METHOD FOR FLOW EQUIPARTITION

CROSS-REFERENCE TO RELATED APPLICATIONS

Priority is claimed to U.S. patent application Ser. No. 15/106,405, filed on Jun. 20, 2016, which is a National Stage entry of PCT/IB15/51939, filed on Mar. 17, 2015, the entire contents of which are incorporated herein by reference.

FIELD OF THE DISCLOSURE

The present disclosure generally relates to the distribution of gas and, more particularly, to an equipartition apparatus for systems or stations for adjusting pressure exerted on two or more lines.

BACKGROUND

The systems or stations for adjusting the pressure on several lines are essentially plants which allow networks to be fed for carrying and distributing gas to civil and industrial users. Purely by way of example, systems for adjusting the pressure are used in distribution networks for reducing the gas pressure from medium pressure to low pressure.

With reference to the general current standards, the term "low feed pressure" is defined as a pressure between approximately 0.04 bar and approximately 12 bar, "medium feed pressure" is defined as a pressure between approximately 12 bar and approximately 24 bar, and above approximately 24 bar is defined as "high pressure".

The reference to "two or more lines" in the above-mentioned adjusting systems refers to the fact that these adjusting systems typically can include several pressure-adjusting lines arranged in parallel. Of these lines, one is generally referred to as "main", as it is normally operational, and the others are referred to as "secondary", as this line is normally inactive and designed to enter into operation in the case of a fault or malfunction of the main line.

The main and secondary lines are calibrated differently and, if the main line is no longer able to feed gas at the calibration pressure, the secondary lines activate automatically, feeding gas at the relative calibration pressure, which is lower than that of the main line.

Existing devices designed to manage the equipartition of the flow between various lines in parallel have substantial drawbacks. For example, these devices require, so as to be able to control the adjusting devices of the various lines, one or more additional control units, thereby complicating the architecture of the adjusting system and consequently increasing both the plant and management costs. Another drawback is due to the impossibility of guaranteeing, at least in the case of a fault on the main line, an adequate and safe operation of the remaining parts of the plant. Another drawback resulting from the introduction of additional control units, in addition to the management complexity, is due to the need to alter the existing service parameters such as, for example, the calibration values of the original control units.

SUMMARY

In accordance with a first aspect, a system includes a first pressure-adjusting device positioned in a first line and a second pressure-adjusting device positioned in a second line. The first pressure-adjusting device is actuated solely via a first pneumatic signal output from a first pilot valve to control a downstream pressure in the first line. The second pressure-adjusting device is actuated via the first pneumatic signal in a first mode of operation, and is actuated via a second pneumatic signal output from a second pilot valve in a second mode of operation to control a downstream pressure in the second line. In some examples, in the second mode of operation, the downstream pressure in the second line is less than the downstream pressure in the first line.

In some approaches, the system may additionally include a pneumatic connection conduit that connects the first pilot valve and the second pressure-adjusting device to determine a pressure equal to the downstream pressure in the first line. Further, the system may include a pneumatic switch positioned along the pneumatic connection conduit. The pneumatic switch is adapted to interrupt the connection between the first pilot valve and the second pressure-adjusting device. The pneumatic switch may also be configured to remain normally open for downstream pressure values in the first line that are greater than or equal to a first predetermined pressure determined by the first pilot valve or a second predetermined pressure determined by the second pilot valve.

In some examples, the system may include a controller that controls the pneumatic switch by selectively activating closure of the pneumatic switch. The controller may be a pneumatic controller and may include a pneumatic feeding conduit to feed the pneumatic switch. The pneumatic feeding conduit is connected to the first line to feed gas thereto. The pneumatic switch may include a membrane and a spring. The spring may be adapted to oppose a force generated by action of the gas pressure acting on the membrane.

In some examples, the controller may be in the form of an electrical controller that includes a pressure sensor positioned along the first line for feeding gas thereto, an electric actuator positioned inside the pneumatic switch, and an electrical circuit connecting the sensor and the electric actuator. The circuit may include a control unit to activate the electric actuator and close the pneumatic switch when the sensor detects, on the first line, a pressure value less than a first predetermined pressure determined by the first pilot valve.

In accordance with a second aspect, a method includes positioning a first pressure-adjusting device in a first line, and positioning a second pressure-adjusting device in a second line. The first pressure-adjusting device is actuated solely via a first pneumatic signal that is output from a first pilot valve to control a downstream pressure in the first line. The second pressure-adjusting device is actuated via the first pneumatic signal in a first mode of operation and via a second pneumatic signal that is output from a second pilot valve in a second mode of operation to control a downstream pressure in the second line.

In accordance with a third aspect, a method for controlling a system having a first pressure-adjusting device positioned in a first line, a second pressure-adjusting device positioned in a second line, a first pilot valve that outputs a first signal, and a second pilot valve that outputs a second signal is provided. The method includes controlling a downstream pressure in the first line by actuating the first pressure-adjusting device solely via the first pneumatic signal output from the first pilot valve. In a first mode of operation, a downstream pressure in the second line is controlled by actuating the second pressure-adjusting device via the first pneumatic signal output from the first pilot valve. In a second mode of operation, the downstream pressure in the second line is controlled by actuating the second pressure-adjusting device via the second pneumatic signal output from the second pilot valve.

BRIEF DESCRIPTION OF THE DRAWINGS

The above needs are at least partially met through provision of the apparatus and method for flow equipartition described in the following detailed description, particularly when studied in conjunction with the drawings, wherein.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to these various embodiments, an equipartition apparatus is provided which is able to operate effectively and safely in the case of a fault or malfunction on one of the gas feed lines, without outside energy sources, and which is also inexpensive to make. Another aim of this invention is to provide a method for equipartition of the gas flow between two feed lines which is practical, simple to manage and efficient. The above-mentioned aims are achieved according to this invention by an apparatus and method for equipartition of the flow of gas comprising the technical features described in the appended claims.

Gas distribution firms are implementing low cost and fully automatic apparatuses for equipartition of the flow that allow the two or more existing lines to always run in parallel with a flow of gas equipartitioned and substantially equal. In short, this modification theoretically allows the achievement of many advantages. A first advantage is a considerable lowering of the noise level since the flow of gas would be divided between several lines. Another advantage is always having in operation the lines, to prevent the problems of sticking of the seals (O-rings) which sometimes occurs when, following a fault on the main line, an emergency line (secondary) must intervene after long periods of inactivity. The problem of sticking of the O-rings is caused by the prolonged inactivity of the apparatuses, a problem which would be resolved by making the lines normally operating.

Another advantage that would be achieved by making several lines operate in parallel would be that of not having to design the lines to operate, for example in the case of two lines, one at 100% and the other at for example 70% but it might, instead, be possible to design both lines to each cover 50% of the total flow. In this way there would be considerable savings also in terms of costs and installation spaces, moreover being able to overcome any faults in the lines by adopting a grid architecture of the current gas distribution networks.

Figure 1:
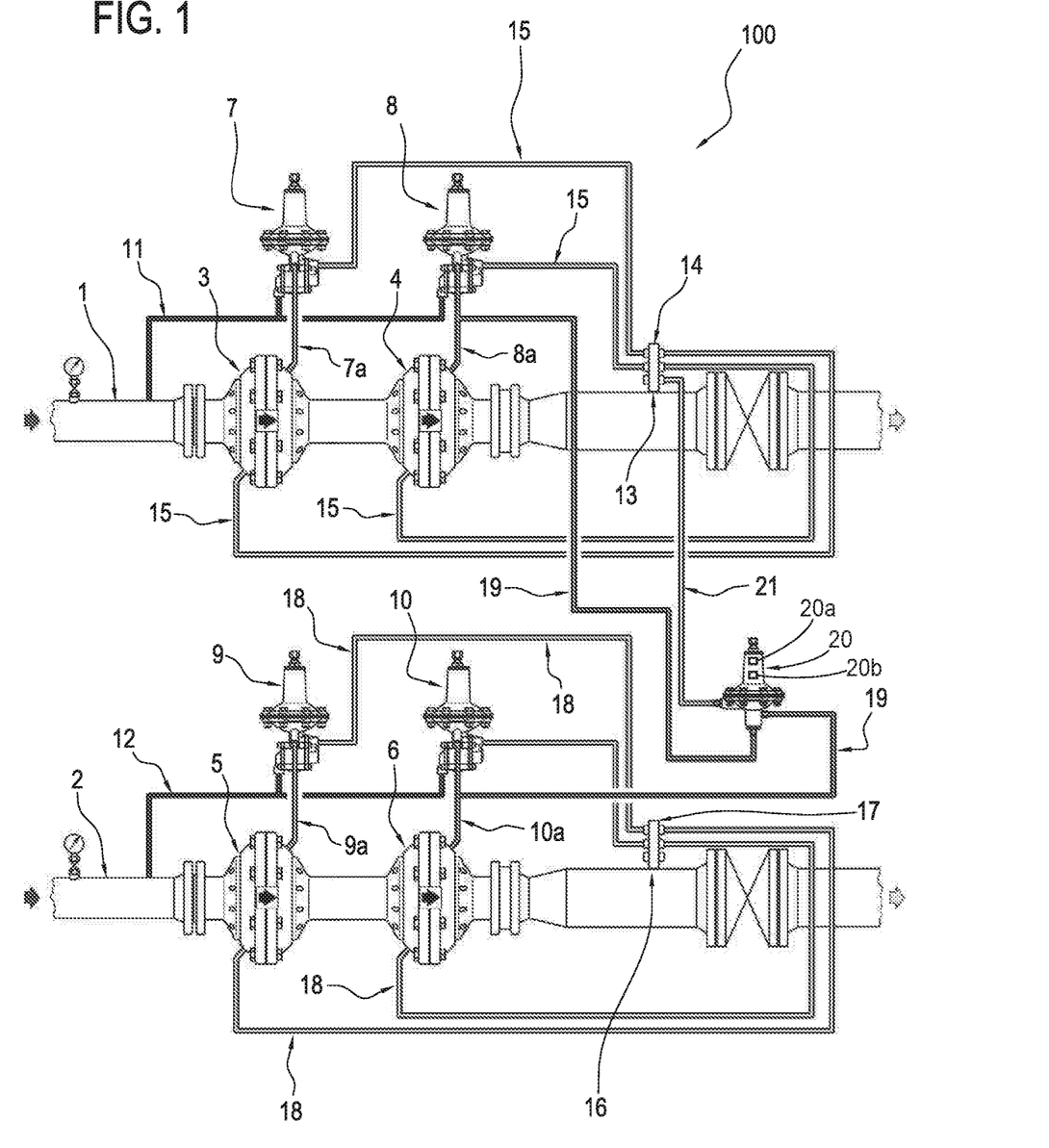
FIG. 1 is a schematic view of a preferred embodiment of the apparatus in accordance with various embodiments.

With reference to the accompanying drawings, the numeral 100 denotes in its entirety an apparatus for equipartition of the flow between several gas feed lines. With reference to FIG. 1, the numeral 1 denotes a section of a first line for feeding gas hereafter also referred to as the main line. Numeral 2, on the hand, denotes a section of a second line for feeding gas, parallel to the above-mentioned first line 1, hereinafter also referred to as the secondary line. Respective arrows indicate the direction of travel of the gas along the lines 1, 2.

With reference to the first line 1, along the section illustrated there are, one after the other, two devices 3, 4, of substantially known type, for adjusting the pressure. The adjusting device 3 positioned upstream relative to the above-mentioned direction of travel is a reserve device whilst the adjusting device 4 positioned downstream is the one normally operating, which therefore adjusts the pressure of the gas passing through it. The adjusting device 4 positioned downstream will be referred to hereinafter also as the first adjusting device.

Similarly, with reference to the second line 2, along the illustrated section there are, one after the other, two respective devices 5, 6, for adjusting the pressure, also of substantially known type. The adjusting device 5 positioned upstream, relative to the above-mentioned direction of travel, is a reserve device whilst the adjusting device 6 positioned downstream is the one normally operating, which therefore adjusts the pressure of the gas passing through it. The adjusting device 6 positioned downstream will be referred to hereinafter also as the second adjusting device. The above-mentioned pressure-adjusting devices 3, 4, 5, 6 contribute to defining, on the lines 1, 2, a pressure-adjusting system.

Purely by way of an example, assuming to be at a so-called final adjusting system, which receives the gas from pipes at a low-pressure for distribution to networks for feeding users, it can be considered that, upstream of the adjusting devices 3, 5, the gas pressure is approximately 5 bar whilst downstream of the first and second adjusting device 4, 6 it is in the order of 20 mbar. 15 These values are given purely by way of an example and do not limit the scope of the application.

For each of the pressure-adjusting devices 3, 4, 5, 6, the apparatus according to this invention comprises a respective control unit 7, 8, 9, 10. The control units 7, 8, 9, 10 are of substantially known type and are actuated pneumatically using the difference in pressure of the gas between upstream and downstream of the pressure-adjusting devices 3, 4, 5, 6. Each control unit 7, 8, 9, 10 is connected to the respective adjusting device 3, 4, 5, 6 by a respective drive conduit 7a, 8a, 9a, 10a.

In the following description, the control units 8, 10 of the first and second pressure-adjusting device 4, 6 will also be indicated, respectively, as the first control unit 8 and the second control unit 10. The apparatus 100 for equipartition of the flow between several gas supply lines comprises a number of control units 7, 8, 9, 10 equal to the number of pressure-adjusting devices 3, 4, 5, 6 present on the lines 1 and 2. In other words, this means that the apparatus 100 does not include any auxiliary control unit other than those relative to each pressure-adjusting device 3, 4, 5, 6.

The safety regulations regarding gas distribution require that each pressure-adjusting device be associated with a relative control unit. The assembly described herein is also normally subjected to testing.

Each feed line 1, 2 also comprises a respective actuating conduit 11, 12 for driving the control units 7, 8, 9, 10. On the first line 1, downstream of the first adjusting device 4, there is a pressure pick-up point 13. From this point, 13, advantageously integrating a manifold 14, a plurality of pipes 15 extend, designed to transmit the measured pressure value (normally P1) to the various devices forming part of the adjusting system on the line 1.

Similarly to the discussion with reference to the first line 1, on the 15 second line 2, downstream of the second adjusting device 6, there is a pressure pick-up point 16. From this point 16, advantageously integrating a manifold 17, a plurality of pipes 18 extend, designed to transmit the measured pressure value to the various devices forming part of the adjusting system on the line 2. In particular, both the pressure-adjusting devices 3, 4, 5, 6 and the relative control units 7, 8, 9, 10 need, in known manner, for the correct operation, to receive a signal representing the pressure value downstream of the first and second adjusting device 4, 6.

One approach to transmitting this value is that of placing directly in communication each of the above-mentioned adjusting devices and control units with the gas on the respective line, downstream of the adjusting device 4, 6. As illustrated in FIG. 1, the equipartition apparatus 100 comprises a pneumatic conduit 19 for connecting the first control unit 8 of the first adjusting device 4 with the second adjusting device 6, to determine in the second line 2, downstream of the second adjusting device 6, a pressure P1 equal to that adjusted on the first line 1.

In practice, the pneumatic conduit 19 connects the conduit 8a with the conduit 10a, effectively excluding the control unit 10 from the control of the second adjusting device 6, thanks to the calibration pressure P2 of the unit 10 which is less than the calibration pressure P1 of the unit 8. In other words, by means of the pneumatic connection conduit 19, the control unit 8 of the first adjusting device 4 also controls the second adjusting device 6, effectively equipartitioning the pressure of the gas passing along the two lines 1, 2 downstream of the apparatus 100.

As illustrated in FIG. 1, the equipartition apparatus 100 comprises an automatic pneumatic switch 20 positioned along the pneumatic connection conduit 19. The pneumatic switch 20 is designed to interrupt the pneumatic connection between the first control unit 8 and the second device 6 for adjusting the pressure of the second line 2. As illustrated in FIG. 1, the apparatus 100 comprises a pneumatic conduit 21 for feeding the switch 20. The switch 20 is therefore a pneumatically operated pneumatic switch. The pneumatic feeding conduit 21 is connected to the first gas feed line 1, downstream of the first adjusting device 4, in a zone subjected normally to the above-mentioned first predetermined pressure P1. Advantageously, the pneumatic conduit 21 is connected to the manifold 14 defining the above-mentioned pick-up point 13. Further, the pneumatic switch 20 comprises a membrane 20a and a spring 20b opposing the force generated by the action of the 25 gas pressure acting on the membrane 20a.

The above-mentioned pneumatic feeding conduit 21 defines for the apparatus 100 means of a pneumatic type for controlling the pneumatic switch 20. In the variant embodiment illustrated in FIG. 2, the equipartition 30 apparatus 100 comprises, as an alternative to the switch 20 described above, a pneumatic switch 20e actuated electrically, inside an electrical circuit 22. The electrical circuit 22 comprises a pressure sensor 23 positioned along the main line 1 for measuring the pressure value existing on the main line 1 downstream of the first adjusting device 4, a value which is normally that of the pressure P1 determined by the first control unit 8.

Figure 2:
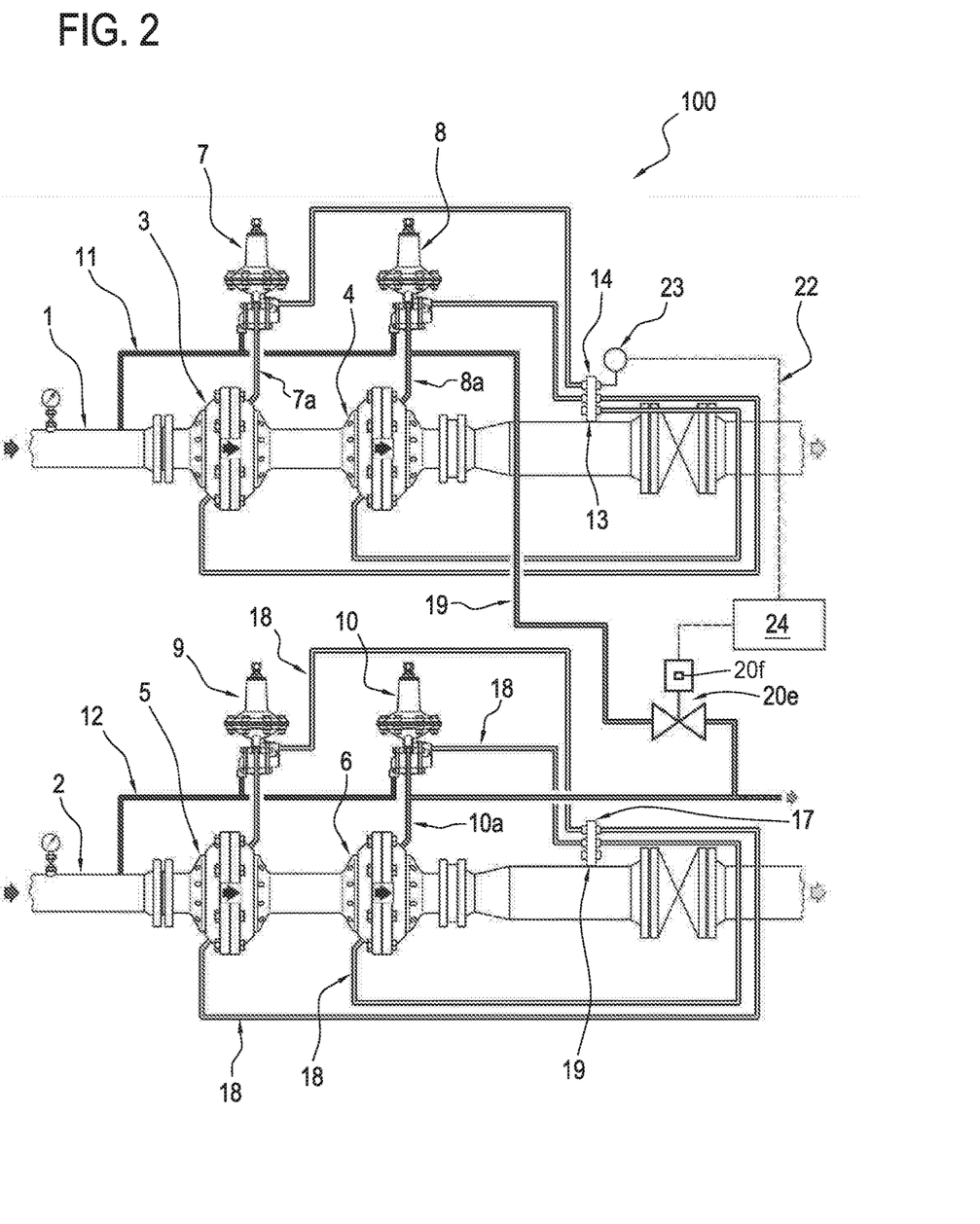
FIG. 2 is a schematic view of a variant embodiment of the apparatus of FIG. 1 in accordance with various embodiments.

The pressure sensor 23 transforms the measured pressure value into an electrical signal which through the circuit 22 reaches a control unit 24 that operates the pneumatic switch 20e actuated electrically. More precisely, according to a preferred embodiment, the control unit 24 controls an electric actuator 20f contained inside the switch 20e and opposed by a spring which, in the absence of the action of the actuator 20f, would tend to close the switch 20e, that is, interrupt the connecting conduit 19. This circumstance is equivalent, as described above, to interrupting the 15 pneumatic connection between the first control unit 8 and the second device 6 for adjusting the pressure of the second line 2.

The above-mentioned pressure sensor 23, electrical connecting circuit 22 and control unit 24 define, in their entirety, electrical means of controlling the pneumatic switch 20e.

Figure 3:
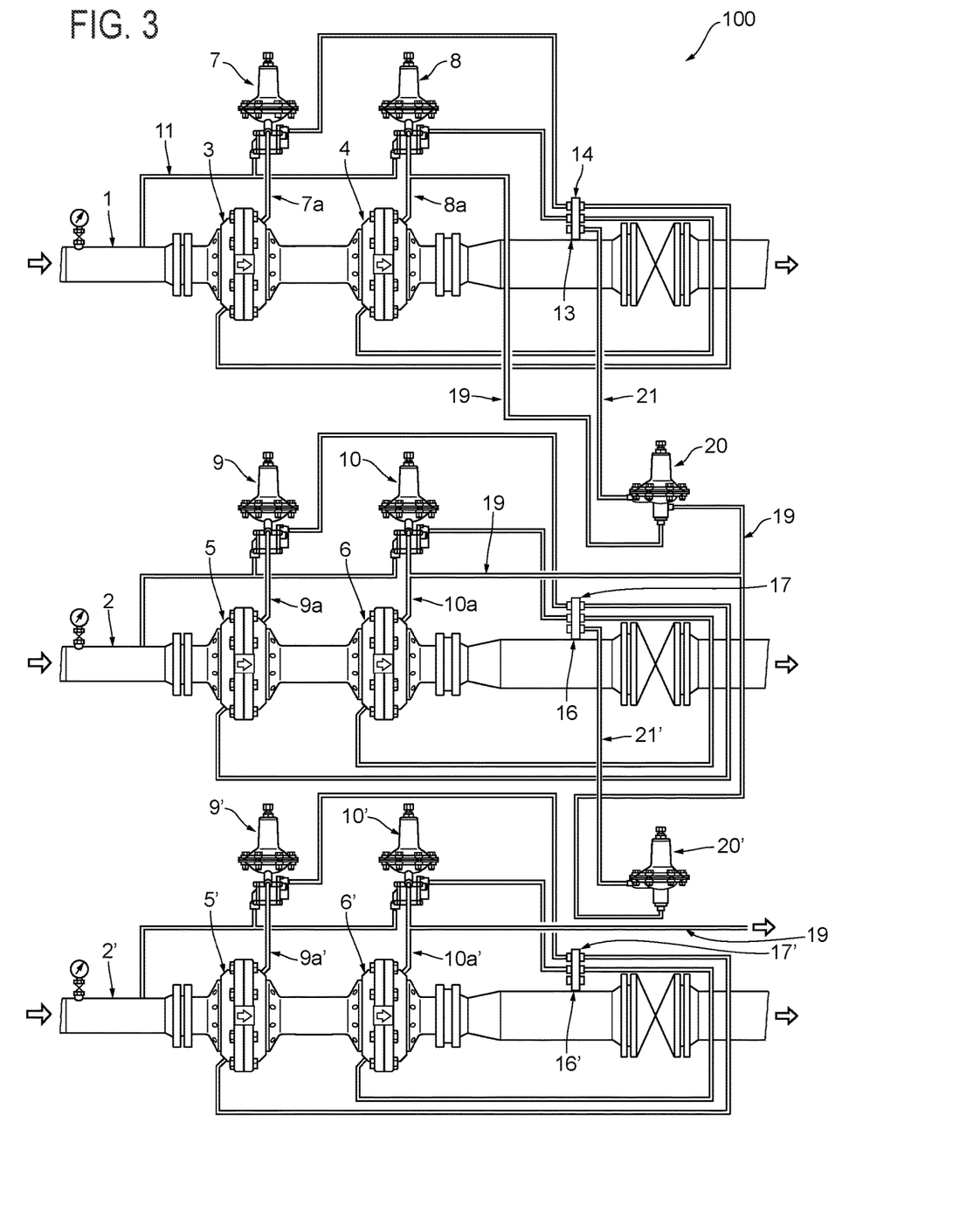
FIG. 3 is a schematic view of a further variant embodiment of the apparatus of FIG. 1 in accordance with various embodiments.

In the variant embodiment illustrated in FIG. 3, the equipartition apparatus 100 operates on three lines 1, 2, 2' for feeding the gas. With regard to the component elements of the lines 1 and 2, reference should be made to the above description regarding FIG. 1. The line 2' is also a secondary line like the line 2 described above. The component elements of the line 2' corresponding and equivalent to elements already indicated with reference to the line 2, are denoted with the same numerical reference differentiated solely by an apex as in the case of 2 and 2' indicated above.

In the apparatus 100 illustrated in FIG. 3, the conduit 19 connects the 30 control unit 8 of the first adjusting device 4 with the second adjusting device 6 and also with a third adjusting device 6' of the third line 2', to determine, both in the second line 2, downstream of the second adjusting device 6, and in the third line 2', downstream of the third adjusting device 6', a same pressure P1 equal to that adjusted on the first line 1. In this case, the pneumatic conduit 19 connects the conduit 8a both with the conduit 10a and with the conduit 10'a, effectively excluding both the control unit 10 from the control of the second adjusting device 6, and the control unit 10' from the control of the third adjusting device 6', thanks to the fact that both the calibration pressure P2 of the unit 10 and the calibration pressure P3 of the unit 10' are less than the calibration pressure P1 of the unit 8.

In other words, by means of the pneumatic connection conduit 19 the control unit 8 of the first adjusting device 4 also controls the further adjusting devices 6, 6', effectively equipartitioning the pressure of the gas passing along all the lines 1, 2, 2' downstream of the apparatus 100.

In use, with reference to the diagram shown in FIG. 1, during normal operation, the first control unit 8 of the first device 4 for adjusting the pressure of the main line 1 also controls the second device 6 for adjusting the pressure of the secondary line 2. In this way, both the lines 1, 2 feed gas downstream at the same calibration pressure P1 as the first control unit 8. This, as mentioned, occurs under normal operation of the equipartition apparatus 100, where, precisely, the flow of gas is equally distributed between the main line 1 and the secondary line 2.

The automatic pneumatic switch 20, calibrated at a pressure Pv slightly less than P1, is therefore normally active, that is to say, open, allowing the pneumatic connection between the first control unit 8 and the second device 6 for adjusting the pressure of the secondary line 2, through the connecting conduit 19. In this normal operating condition, the second control unit 10 associated with the second device 6 for adjusting the pressure of the second line 2 is inactive (but designed to determine, when active, downstream of the second adjusting device 6, a second pressure P2 less than both the pressure P1 and the calibration pressure Pv of the pneumatic switch). If there is a fault or a malfunction on the main line, such as to determine downstream of the adjusting device a lowering of the pressure to a value PO which is also considerably less than the calibration value P1 of the first control unit 8, the pressure PO is established immediately also within the pneumatic switch 20.

In short, the above-mentioned lowering of pressure along the main line 1 can result from a drawing of gas by users downstream, which is not supported by a suitable feed flow; this circumstance usually occurring due to a blockage caused by a fault. Since the pneumatic switch 20 is calibrated at a pressure Pv just less than the value P1, it deactivates immediately (when it reaches the pressure PO significantly less than P1), thus interrupting the pneumatic conduit 19 for connecting between the first control unit 8 and the second device 6 for adjusting the pressure of the secondary line 2.

Following this interruption, the second control unit 10 becomes active on the second pressure-adjusting device 6, imposing on the adjusting device 6 a relative calibration pressure P2, less than both P1 and Pv. In this way, following the modified command on the second adjusting device 6, the new pressure P2, which is less than the pressure P1 existing on both the lines 1, 2 for feeding the gas when both were operating, is created on the second line 2.

The operation of the apparatuses 100 illustrated in FIGS. 2 and 3 is not unlike that just described with reference to FIG. 1. With regard to the embodiment shown in FIG. 2, the pneumatic switch 20e actuated electrically is activated by the respective control unit 24 as a function of the pressure value measured by the pressure sensor 23. However, in the embodiment of FIG. 3 there are two pneumatic switches 30 20, 20', each acting on the connecting conduit 19 and controlled by the pressure measured respectively at the pick-up points 13 and 16.

The switch 20 is designed to interrupt the connecting conduit 19 in the case of lowering of the pressure on the line 1, while the switch 20' is designed to interrupt the connecting conduit 19 in the case of lowering of the pressure on the line 2. Similarly to what is described above regarding calibration of the pneumatic switch 20 at a pressure Pv slightly less than the value P1, in the case of the pneumatic switch 20', it is calibrated at a pressure P'v slightly less than the value P2 and in any case greater than P3. In this way, following a fault on the line 1, the calibration pressure P2 of the second control unit 10 is established on the line 2 and the same occurs on the third line 2', operating the second control unit 10, through the lower section of the conduit 19, also on the third adjusting device 6'. When, the other hand, a fault also occurs on the second line 2, the switch 20' will interrupt the conduit 19 and the second adjusting device 6' will be adjusted by the respective control unit 10' that will impose the relative calibration pressure P3 on the third line 2'.

Figure 4:
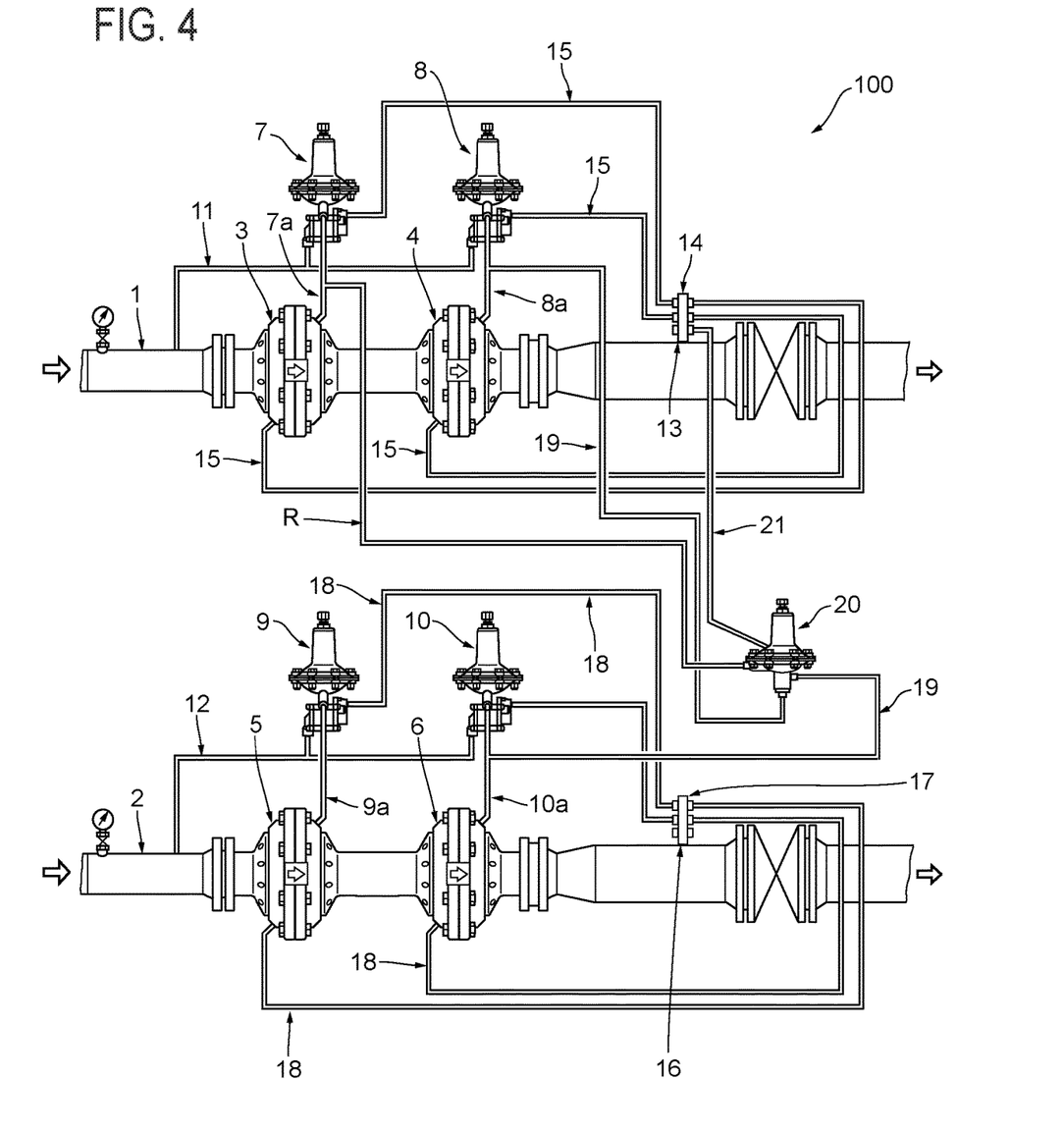
FIG. 4 is a schematic view of a further variant embodiment of the apparatus of FIG. 1 in accordance with various embodiments.

In the variant embodiment illustrated in FIG. 4, the equipartition apparatus 100 comprises a pneumatic conduit R for connecting the pneumatic switch 20 to the conduit 7a for driving the standby pressure-adjusting device 3 of the main line, the conduit being interposed between the control unit 7 and the standby pressure-adjusting device 3. The pneumatic switch 20 is therefore driven by the pressure existing in the conduit 7a for driving the standby pressure-adjusting device 3.

According to the embodiments illustrated in FIGS. 1 to 3, the pneumatic switch 20, driven by the pressure existing in the manifold 14, interrupts the pneumatic conduit 19 for connecting between the first control unit 8 and the second pressure-adjusting device 6 following a complete malfunction on the main line, this malfunction consisting basically in a block (closure) of the line itself. In the variant embodiment of FIG. 4, on the other hand, the pneumatic switch 20 interrupts the pneumatic conduit 19 when the standby pressure-adjusting device 3 intervenes. In other words, the pneumatic switch 20 intervenes following a malfunction of the device 4 of the main line 1 such as to cause the intervention of the standby pressure-adjusting device 3 of the main line 1, but not necessarily the block of the dispensing of gas of that line 1.

By actuating the above-mentioned operation, the equipartition apparatus 100 according to this invention, in its many alternative embodiments, brings important advantages. A first of these advantages is due to the fact that the devices 4, 6, 6' for adjusting the various lines do not require, for their control, control units in addition to those already usually provided on each feed line. Another advantage is the possibility, in the event of a fault on the main line of guaranteeing an adequate and safe operation of the remaining lines 2' even though at slightly reduced pressures. Another advantage achieved by the apparatus 100 for equipartition of the pressure according to this invention is the fact that the original service parameters of the individual lines can be maintained, such as, for example, the calibration pressure values P1, P2, P3 of the original control units already present on the lines 1, 2, 2' regardless of their operation in equipartition mode.

Another advantage, specifically for the embodiments illustrated in FIGS. 1 and 3, that is to say, having pneumatically operated pneumatic switches 20, 20, is that of not requiring, for their operation, any energy supply other than the energy of the gas pressure carried by the lines 1, 2, 2'. In other words, unlike equipartition apparatuses of known type, the apparatus according to this invention in its embodiments which adopt a pneumatically operated pneumatic switch 20, 21, does not need for its correct operation any source of external energy (for example to supply a solenoid valve).

The system and method described above is susceptible of industrial application and may be modified and adapted in several ways (such as, for example, in the equipartition of the flow between high pressure lines) without thereby departing from the scope of the inventive concept. Moreover, all the details of the invention may be substituted by technically equivalent elements.

Unless specified otherwise, any of the feature or characteristics of any one of the embodiments of the apparatus and method for flow equipartition disclosed herein may be combined with the features or characteristics of any other embodiments of the apparatus and method for flow equipartition.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed is:

1. A system, comprising:
a first pressure-adjusting device that is positioned in a first line, wherein the first pressure-adjusting device is pneumatically actuated via a single first pneumatic signal that is output from a first control unit, the first control unit using a difference in pressure between upstream and downstream of the first pressure-adjusting device to actuate, thus controlling a downstream pressure in the first line; and
a second pressure-adjusting device that is positioned in a second line, wherein the second pressure-adjusting device is pneumatically actuated via the first pneumatic signal in a first, normal mode of operation and via a second pneumatic signal that is output from a second control unit in a second, fault mode of operation to control a downstream pressure in the second line;
wherein a total number of control units outputting the first pneumatic signal to control a downstream pressure in the first line consists of one control unit.

2. The system of claim 1, wherein in the second, fault mode of operation, the downstream pressure in the second line is less than the downstream pressure in the first line.

3. The system of claim 1, further comprising a pneumatic connection conduit, the pneumatic connection conduit connecting the first control unit and the second pressure-adjusting device to determine a pressure equal to the downstream pressure in the first line.

4. The system of claim 3, further comprising a pneumatic switch positioned along the pneumatic connection conduit, the pneumatic switch being adapted to interrupt the connection between the first control unit and the second pressure-adjusting device.

5. The system of claim 4, wherein the pneumatic switch is adapted to remain normally open for downstream pressure values in the first line that are greater than or equal to a first predetermined pressure determined by the first control unit or a second predetermined pressure determined by the second control unit.

6. The system of claim 4, further comprising a controller adapted to control the pneumatic switch by selectively activating closure of the pneumatic switch.

7. The system of claim 6, wherein the controller is a pneumatic controller and comprises a pneumatic feeding conduit to feed the pneumatic switch, the pneumatic feeding conduit being connected to the first line to feed gas thereto.

8. The system of claim 7, wherein the pneumatic switch comprises a membrane and a spring, the spring adapted to oppose a force generated by action of the gas pressure acting on the membrane.

9. The system of claim 6, wherein the controller is an electrical controller comprising:
a pressure sensor positioned along the first line for feeding gas thereto;
an electric actuator positioned inside the pneumatic switch; and
an electrical circuit connecting the sensor and the electric actuator;
wherein the circuit comprises a third control unit to activate the electric actuator and close the pneumatic switch when the sensor detects, on the first line, a pressure value less than a first predetermined pressure determined by the first control unit.

10. A method, comprising:
positioning a first pressure-adjusting device in a first line, wherein the first pressure-adjusting device is pneumatically actuated via a single first pneumatic signal that is output from a first control unit, the first control unit using a difference in pressure between upstream and downstream of the first pressure-adjusting device to actuate, thus controlling to control a downstream pressure in the first line; and
positioning a second pressure-adjusting device in a second line, wherein the second pressure-adjusting device is actuated via the first pneumatic signal in a first, normal mode of operation and via a second pneumatic signal that is output from a second control unit in a second, fault mode of operation to control a downstream pressure in the second line;
wherein a total number of control units outputting the first pneumatic signal to control a downstream pressure in the first line consists of one control unit.

11. The method of claim 10, further comprising:
connecting, via a pneumatic connection conduit, the first control unit and the second pressure-adjusting device; and
determining, via the first control unit, a pressure equal to the downstream pressure in the first line.

12. The method of claim 11, further comprising:
positioning a pneumatic switch along the pneumatic connection conduit, wherein the pneumatic switch is adapted to interrupt the connection between the first control unit and the second pressure-adjusting device.

13. The method of claim 12, further comprising configuring the pneumatic switch to remain normally open for downstream pressure values in the first line that are greater than or equal to a first predetermined pressure determined by the first control unit or a second predetermined pressure determined by the second control unit.

14. The method of claim 12, further comprising controlling, via a controller, the pneumatic switch by selectively activating closure of the pneumatic switch.

15. The method of claim 14, wherein the step of controlling the pneumatic switch via the controller comprises controlling the pneumatic switch via a pneumatic controller having a pneumatic feeding conduit that feeds the pneumatic switch and that is connected to the first line to feed gas thereto.

16. The method of claim 15, wherein the step of controlling the pneumatic switch via the controller comprises:
generating, via a gas pressure, a force that acts on a membrane; and
opposing the force acting on the membrane via a spring.

17. The method of claim 14, wherein the step of controlling the pneumatic switch via the controller includes controlling the pneumatic switch via an electric controller by feeding gas to the first line via a pressure sensor positioned along the first line; and
actuating an electrical circuit with a third control unit that activates an electric actuator and closes the pneumatic switch upon the pressure sensor detecting a pressure value that is less than a first predetermined pressure determined by the control unit.

18. A method for controlling a system having a first pressure-adjusting device positioned in a first line, a second pressure-adjusting device positioned in a second line, a first control unit that outputs a first signal, the first control unit using a difference in pressure between upstream and downstream of the first pressure-adjusting device, and a second control unit that outputs a second signal, the method comprising:

controlling a downstream pressure in the first line by pneumatically actuating the first pressure-adjusting device via the first pneumatic signal output from the first control unit;

in a first, normal mode of operation, controlling a downstream pressure in the second line by actuating the second pressure-adjusting device via the first pneumatic signal output from the first control unit; and in a second, fault mode of operation, controlling the downstream pressure in the second line by actuating the second pressure-adjusting device via the second pneumatic signal output from the second control unit;

wherein a total number of control units outputting the first pneumatic signal to control a downstream pressure in the first line consists of one control unit.

19. The method of claim 18, further comprising the step of:

interrupting a connection between the first control unit and the second pressure-adjusting device.

20. The method of claim 19, further comprising maintaining a pneumatic switch in a normally open configuration when downstream pressure values in the first line are greater than or equal to a first predetermined pressure determined by the first control unit or a second predetermined pressure determined by the second control unit.

21. A system, comprising:

a first pressure-adjusting device that is positioned in a first line, wherein the first pressure-adjusting device is pneumatically actuated via a single first pneumatic signal that is output from a first control unit to control a downstream pressure in the first line;

a second pressure-adjusting device that is positioned in a second line, wherein the second pressure-adjusting device is pneumatically actuated via the first pneumatic signal in a first, normal mode of operation and via a second pneumatic signal that is output from a second control unit in a second, fault mode of operation to control a downstream pressure in the second line;

a pneumatic connection conduit, the pneumatic connection conduit connecting the first control unit and the second pressure-adjusting device to determine a pressure equal to the downstream pressure in the first line;

a pneumatic switch positioned along the pneumatic connection conduit, the pneumatic switch being adapted to interrupt the connection between the first control unit and the second pressure-adjusting device; and a controller adapted to control the pneumatic switch by selectively activating closure of the pneumatic switch;

wherein the controller is an electrical controller comprising:

a pressure sensor positioned along the first line for feeding gas thereto;

an electric actuator positioned inside the pneumatic switch; and an electrical circuit connecting the sensor and the electric actuator;

wherein the circuit comprises a third control unit to activate the electric actuator and close the pneumatic switch when the sensor detects, on the first line, a pressure value less than a first predetermined pressure determined by the first control unit.

22. A method, comprising:

positioning a first pressure-adjusting device in a first line, wherein the first pressure-adjusting device is pneumatically actuated via a single first pneumatic signal that is output from a first control unit to control a downstream pressure in the first line;

positioning a second pressure-adjusting device in a second line, wherein the second pressure-adjusting device is actuated via the first pneumatic signal in a first, normal mode of operation and via a second pneumatic signal that is output from a second control unit in a second, fault mode of operation to control a downstream pressure in the second line;

connecting, via a pneumatic connection conduit, the first control unit and the second pressure-adjusting device;

determining, via the first control unit, a pressure equal to the downstream pressure in the first line;

positioning a pneumatic switch along the pneumatic connection conduit, wherein the pneumatic switch is adapted to interrupt the connection between the first control unit and the second pressure-adjusting device; and controlling, via a controller, the pneumatic switch by selectively activating closure of the pneumatic switch;

wherein the step of controlling the pneumatic switch via the controller includes controlling the pneumatic switch via an electric controller by feeding gas to the first line via a pressure sensor positioned along the first line; and actuating an electrical circuit with a third control unit that activates an electric actuator and closes the pneumatic switch upon the pressure sensor detecting a pressure value that is less than a first predetermined pressure determined by the control unit.

* * * * *